(12) United States Patent
Li

(10) Patent No.: US 8,013,557 B2
(45) Date of Patent: Sep. 6, 2011

(54) MOTOR PROTECTION DEVICE AND METHOD

(75) Inventor: Ching-Sheng Li, Hsinchu (TW)

(73) Assignee: Anpec Electronics Corporation, Hsinchu (TW)

( * ) Notice: Subject to any disclaimer, the term of this patent is extended or adjusted under 35 U.S.C. 154(b) by 397 days.

(21) Appl. No.: 11/976,984

(22) Filed: Oct. 30, 2007

(65) Prior Publication Data

US 2009/0108786 A1    Apr. 30, 2009

(51) Int. Cl.
*H02H 7/08* (2006.01)

(52) U.S. Cl. ......... 318/434; 318/471; 318/490; 318/635

(58) Field of Classification Search .................. 318/434, 318/490, 471, 635; 361/23
See application file for complete search history.

(56) References Cited

U.S. PATENT DOCUMENTS

| | | | | |
|---|---|---|---|---|
| 3,988,641 A * | 10/1976 | Hentschel et al. | ............... | 361/31 |
| 4,977,507 A * | 12/1990 | Matsuoka et al. | ............... | 701/43 |
| 5,502,611 A * | 3/1996 | Rodgers | ........................... | 361/85 |
| 6,127,820 A * | 10/2000 | Kessler et al. | ................. | 324/177 |
| 6,150,782 A * | 11/2000 | Breitling et al. | ............... | 318/434 |
| 6,380,707 B1* | 4/2002 | Rosholm et al. | ......... | 318/400.03 |
| 6,960,897 B2* | 11/2005 | Hisamoto et al. | ............. | 318/434 |
| 7,161,778 B2* | 1/2007 | Zocholl | ........................... | 361/25 |
| 7,612,513 B2* | 11/2009 | Ando et al. | .................... | 318/434 |

* cited by examiner

*Primary Examiner* — Bentsu Ro
*Assistant Examiner* — David S Luo
(74) *Attorney, Agent, or Firm* — C. G. Mersereau; Nikolai & Mersereau, P.A.

(57) ABSTRACT

A motor protection device includes a detection unit for detecting an operating state of a motor and outputting a detection signal; a reference unit for generating a variable reference signal; a discriminating unit for comparing the detection signal with the variable reference signal to discriminate whether the motor is in an abnormal condition; and a protection unit that receives a result of discrimination from the discriminating unit and limits a driving current for the motor when the motor is in an abnormal condition. The motor protection device is characterized in that the reference unit adjusts the variable reference signal according to a motor rotation detection signal, so that the motor rotation detection signal and the detection signal are used synchronously in discriminating whether the motor is in an abnormal condition, and the motor in an abnormal condition may be doubly protected.

1 Claim, 5 Drawing Sheets

MOTOR PROTECTION DEVICE AND METHOD

FIELD OF THE INVENTION

The present invention relates to a motor protection device and method, and more particularly to a motor protection device and method that limits a driving current for a motor to a low current value when the motor is in an abnormal condition and stops running due to restriction by an external force.

BACKGROUND OF THE INVENTION

FIG. 1 shows the waveforms of a motor driving current and a motor rotation detection signal in a prior art motor protection. In a conventional motor driving circuit, when the motor is restricted from rotating or becomes locked due to a foreign matter or a stuck rotor, the current supplied to the motor would continuously increase as a result of the locked motor. When the current is increased to a maximum limiting current value set by a current-limit circuit of the motor, the current is maintained at the maximum limiting current value. Then, when the motor is detected as failing to operate via a motor rotation detection signal, the power for driving the motor is cut off to prevent the windings inside the motor from being burned out and damaged due to overheat. And, after a period of time, the motor driving power is resumed and intermittently output, so as to test whether the motor has been released from the abnormal condition.

However, since the driving current limited by the maximum limiting current value set by the current-limit circuit is maintained at a high current the same as that for an initial starting of the motor, the resumed and intermittently output motor driving power would, due to the high current, cause excessive accumulation of heat in the windings inside the motor to result in constant and quick temperature raise in the windings and risks of a burn-out and damaged motor due to high temperature.

Moreover, whether the motor is in an abnormal condition is conventionally discriminated only by the motor rotation detection signal from a motor detection circuit. This type of motor protection does not necessarily meet the public demands for protecting a motor against abnormal condition.

Therefore, it is desirable to develop an improved motor protection device and method to overcome the shortcomings in the motor protection of prior art.

SUMMARY OF THE INVENTION

A primary object of the present invention is to provide a motor protection device and method that limits a driving current for a motor to a low current value when the motor is in an abnormal condition and stops running due to restriction by an external force, so that the motor is protected against burn-out or damage.

Another object of the present invention is to provide a motor protection device and method in which a motor rotation detection signal and a motor detection signal are synchronously used to discriminate whether a motor is in an abnormal condition, so that the motor is doubly protected when the motor is in an abnormal condition.

To achieve the above and other objects, the motor protection device according to the present invention includes a detection unit for detecting an operating state of a motor and outputting a detection signal; a reference unit for generating a variable reference signal; a discriminating unit for comparing the detection signal with the variable reference signal to discriminate whether the motor is in an abnormal condition; and a protection unit that receives a result of discrimination from the discriminating unit and limits a driving current for the motor when the motor is in an abnormal condition. The motor protection device is characterized in that the reference unit adjusts the variable reference signal according to a motor rotation detection signal, so that the motor rotation detection signal and the detection signal are used synchronously in discriminating whether the motor is in an abnormal condition, and the motor in an abnormal condition may be protected in two ways at the same time.

To achieve the above and other objects, the motor protection method according to the present invention is applicable to a motor and includes a detection step in which a detecting signal is output according to an operating state of the motor; a variable reference signal generating step in which a variable reference signal is output according to a motor rotation detection signal; a discriminating step in which the detection signal and the variable reference signal are compared to discriminate whether the motor is in an abnormal condition, and a discriminating signal is output according to the result of discrimination; and a protection step in which the discriminating signal is received and a driving current for the motor in an abnormal condition is limited to a low current value.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
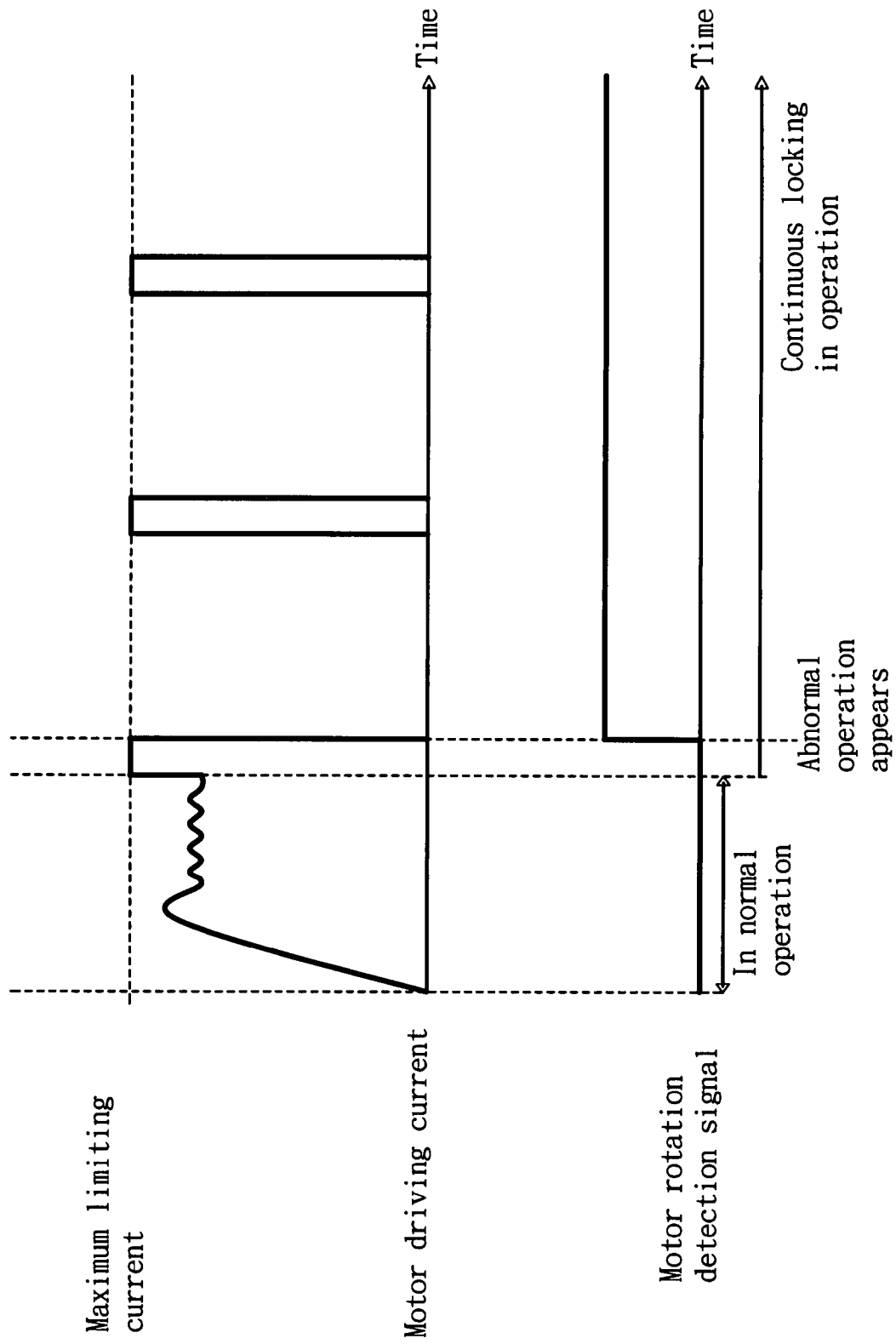
FIG. 1 shows the waveforms of a motor driving current and a motor rotation detection signal in prior art motor protection.
Figure 2:
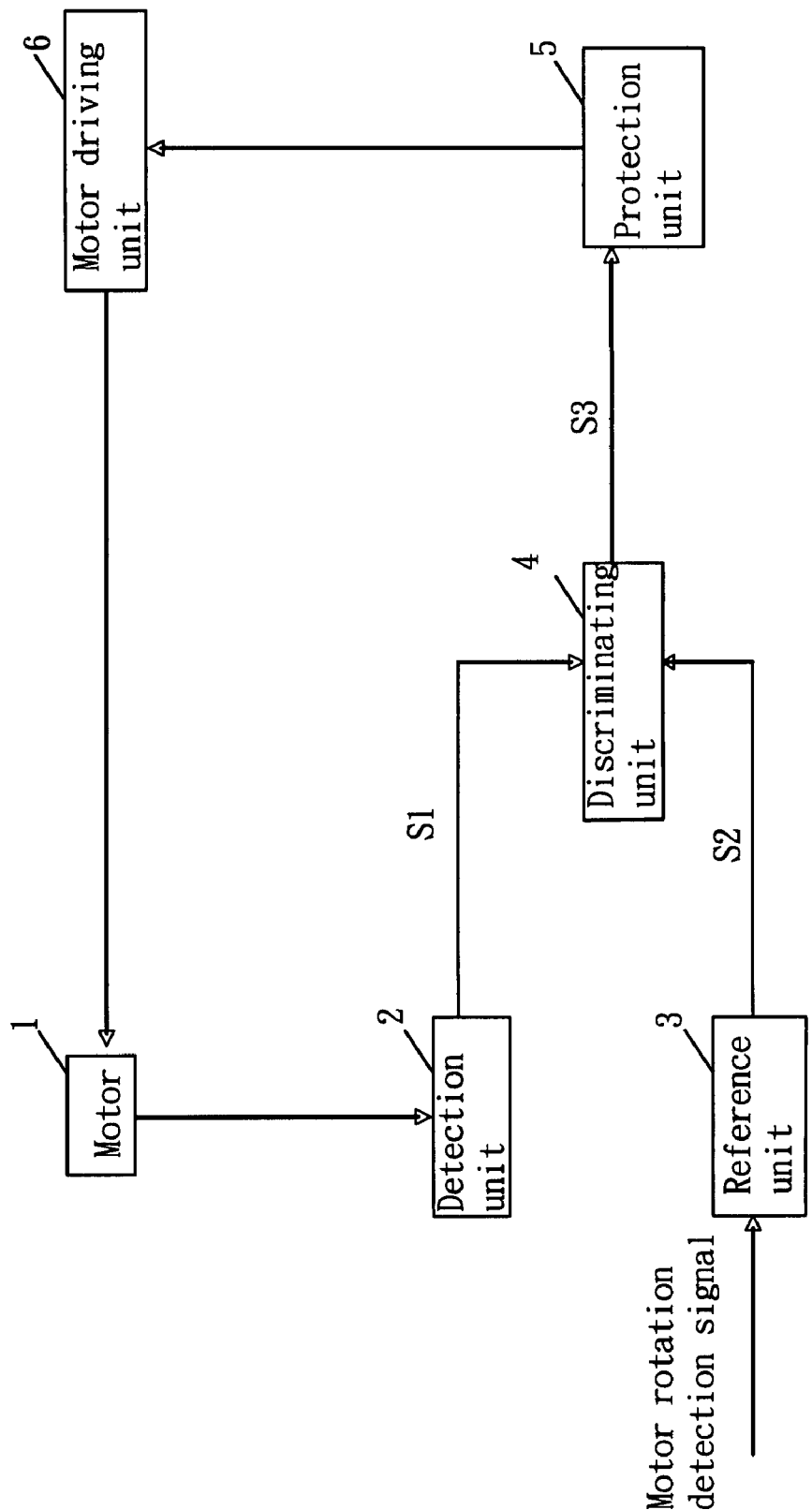
FIG. 2 is a block diagram of a motor protection device according to a preferred embodiment of the present invention.
Figure 3:
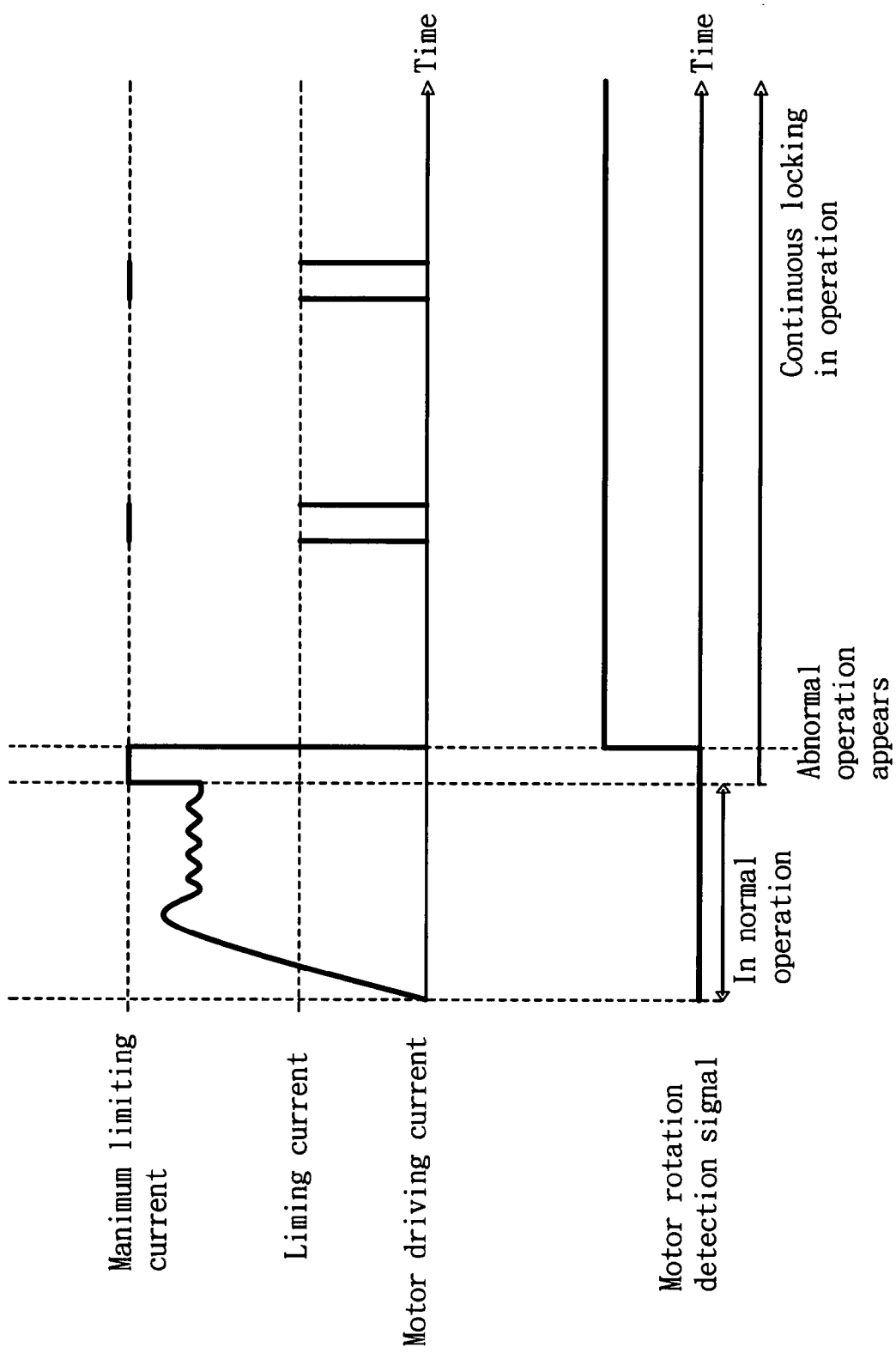
FIG. 3 shows the waveforms of a motor driving current and a motor rotation detection signal in the motor protection device of the present invention.

Please refer to FIG. 2 that is a block diagram of a motor protection device according to a preferred embodiment of the present invention, and to FIG. 3 that shows the waveforms of a motor driving current and a motor rotation detection signal in the motor protection device of the present invention. As shown, the motor protection device of the present invention is applicable to a motor 1, and includes a detection unit 2 for detecting an operating state of the motor 1 and outputting a detection signal S1; a reference unit 3 for generating a variable reference signal S2; a discriminating unit 4 for comparing the detection signal S1 with the variable reference signal S2 to output a discriminating signal S3, which contains a result of discrimination indicating whether the motor 1 is in an abnormal condition; and a protection unit 5 that receives the result of discrimination from the discriminating unit 4, and controls a motor driving unit 6 to limit the motor driving current when the result of discrimination indicates the motor 1 is in an abnormal condition, so that the motor 1 in an abnormal and locked state may intermittently receive a driving current lower than a maximum limiting current value set by an existing current-limit circuit of the motor 1, and the windings inside the motor 1 are effectively protected against burnout or damage due to high temperature caused by excessive accumulation of heat.

The motor protection device of the present invention is characterized in that the reference unit 3 adjusts the variable reference signal S2 according to a motor rotation detection signal, so that the motor rotation detection signal and the detection signal S1 are used synchronously in discriminating whether the motor 1 is in an abnormal condition, and the motor 1 in an abnormal condition may be doubly protected.

Figure 4:
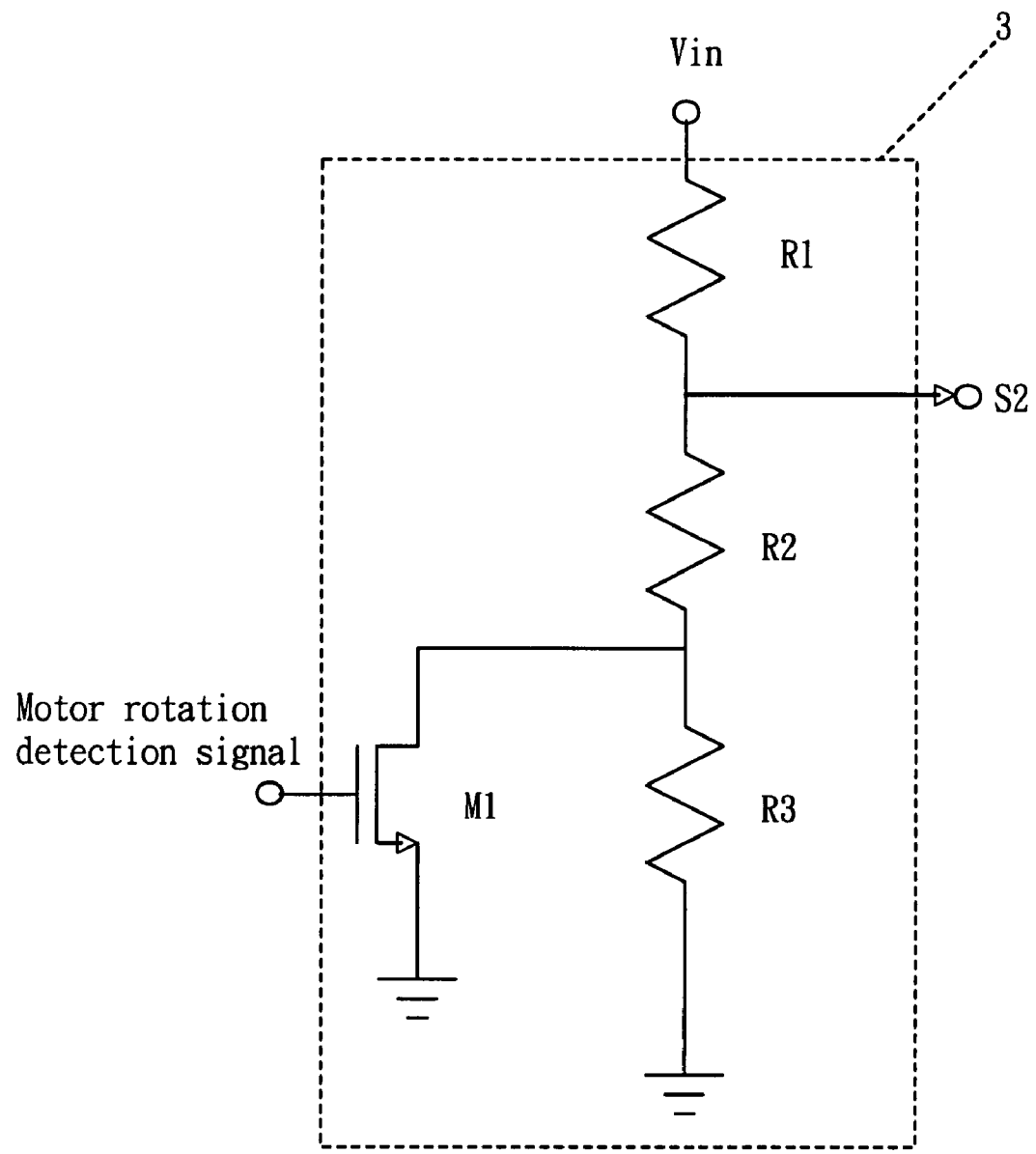
FIG. 4 is a preferred circuit diagram for a reference unit included in the motor protection device of the present invention.

Please refer to FIG. 4 that is a preferred circuit diagram for the reference unit 3. As shown, in this preferred embodiment, the reference unit 3 includes a voltage dividing unit for obtaining a power supply $V_{in}$ to output the variable reference signal S2; and a modulation switch M1 for receiving the motor rotation detection signal to adjust the variable reference signal S2. In the illustrated embodiment, the voltage dividing unit consists of resistors R1, R2, and R3.

Figure 5:
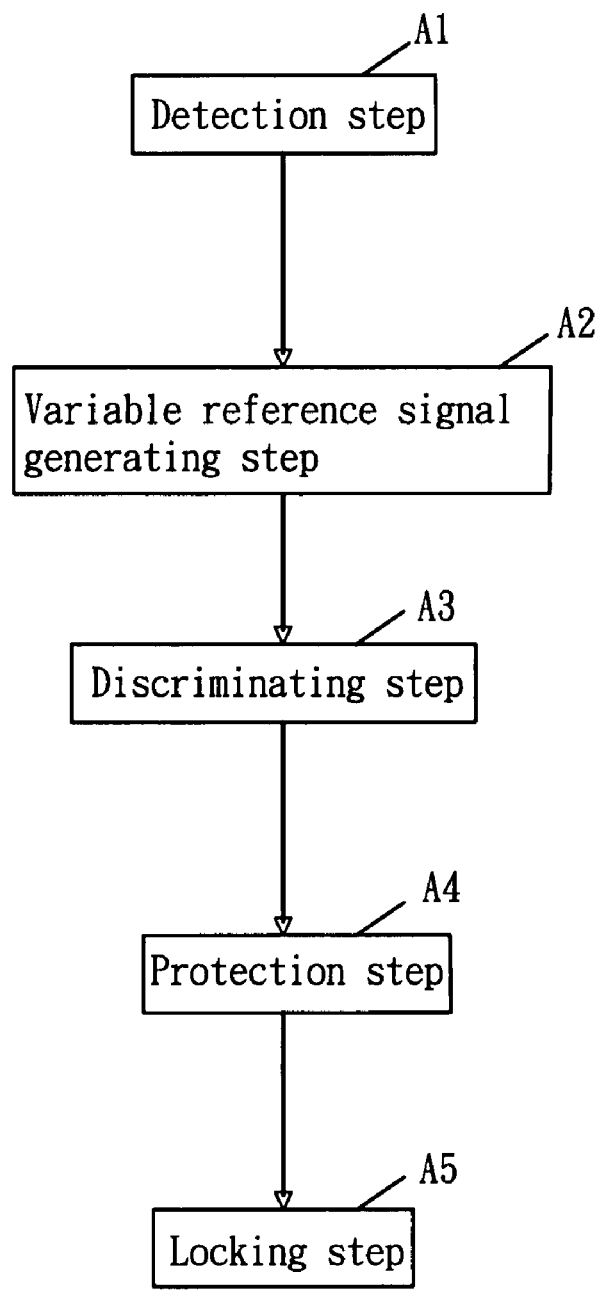
FIG. 5 is a flowchart showing the steps included in a motor protection method according to the present invention.

The present invention also provides a motor protection method applicable to a motor 1. Please refer to FIG. 5 that is a flowchart showing the steps included in the motor protection method according to a preferred embodiment of the present invention.

As shown, the motor protection method of the present invention includes a detection step (A1), in which a detecting signal S1 is output according to an operating state of the motor 1; a variable reference signal generating step (A2), in which a variable reference signal S2 is output according to a motor rotation detection signal; a discriminating step (A3), in which the detection signal S1 and the variable reference signal S2 are compared to discriminate whether the motor 1 is in an abnormal condition, and a discriminating signal S3 is output according to the result of discrimination; and a protection step (A4), in which the discriminating signal S3 is received and a driving current for the motor 1 in an abnormal condition is limited.

In a most preferred embodiment, a locking step (A5) is included after the protection step (A4) for limiting and locking the driving current for the motor 1 to a low current value.

With the present invention, when a motor 1 is restricted by an external force and becomes locked, the driving current for the motor 1 can be limited to prevent the motor 1 from burning out or being damaged by high temperature due to excessive accumulation of heat in the windings inside the motor 1 possibly caused by intermittently output driving power to the motor 1 at a high current value. Moreover, since the motor rotation detection signal and the detection signal S1 are synchronously used to discriminate whether the motor 1 is in an abnormal condition, the motor 1 is doubly protected. Therefore, the motor protection device and method of the present invention are industrial valuable and practical for use.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A motor protection device applicable to a motor, comprising:
  a detection unit for detecting an operating state of the motor and outputting a detection signal;
  a reference unit for generating a variable reference signal;
  a discriminating unit for comparing the detection signal with the variable reference signal to discriminate whether the motor is in an abnormal condition; and
  a protection unit that receives a result of discrimination from the discriminating unit and limits a driving current for the motor below a maximum limiting current for the motor when the motor is in an abnormal condition;
  wherein the reference unit adjusts the variable reference signal according to a motor rotation detection signal that is input to the reference unit, so that the motor rotation detection signal and the detection signal are used synchronously in discriminating whether the motor is in an abnormal condition, and the motor in an abnormal condition may be doubly protected; and
  wherein the reference unit includes a voltage dividing unit for obtaining a power supply to output the variable reference signal; and a modulation switch for receiving the motor rotation detection signal to adjust the variable reference signal.

* * * * *